United States Patent [19]
Kilker

[11] Patent Number: 5,889,341
[45] Date of Patent: Mar. 30, 1999

[54] MULTI-FUNCTIONAL APPARATUS EMPLOYING A LINEAR WIPER

[75] Inventor: Daniel D. Kilker, Canton, Mich.

[73] Assignee: UT Automotive Dearborn, Inc., Dearborn, Mich.

[21] Appl. No.: 947,916

[22] Filed: Oct. 9, 1997

[51] Int. Cl.⁶ .................................................. H02K 41/00
[52] U.S. Cl. ........................................... 310/12; 74/471 R
[58] Field of Search ................................ 310/12, 13, 14; 74/471 R

[56] References Cited

U.S. PATENT DOCUMENTS

| | | | |
|---|---|---|---|
| 2,271,207 | 1/1942 | Rhein | 318/115 |
| 2,615,945 | 10/1952 | Jaeschke | 310/103 |
| 2,659,237 | 11/1953 | Wood | 74/27 |
| 2,722,617 | 11/1955 | Cluwen et al. | 310/103 |
| 2,959,803 | 11/1960 | Ziegler | 15/250.02 |
| 3,361,005 | 1/1968 | Carpenter | 74/436 |
| 3,361,947 | 1/1968 | Schlebusch | 318/115 |
| 3,421,380 | 1/1969 | Mansour | 74/84 R |
| 3,442,146 | 5/1969 | Simpson | 74/84 R |
| 3,443,442 | 5/1969 | Schweihs | 74/1.5 |

(List continued on next page.)

FOREIGN PATENT DOCUMENTS

| | | |
|---|---|---|
| 0 345 002 A2 | 6/1989 | European Pat. Off. . |
| 822 178 | 11/1951 | Germany . |
| 28 16 207 A1 | 10/1979 | Germany . |
| 3807087 A1 | 9/1989 | Germany . |
| 39 23 688 A1 | 1/1991 | Germany . |
| 43 13 363 A1 | 11/1993 | Germany . |
| 43 37 760 A1 | 5/1994 | Germany . |
| 56-22150 | 2/1981 | Japan . |
| 5-86761 | 6/1993 | Japan . |
| 2 153 218 | 8/1985 | United Kingdom . |
| WO 96/33891 | 10/1996 | WIPO . |
| WO 96/33892 | 10/1996 | WIPO . |
| WO 96/33893 | 10/1996 | WIPO . |

OTHER PUBLICATIONS

Patent Abstracts of Japan, vol. 016, 7–438 (M–1309), 11 Sep. 1992 for JP Patent Publication No. 04151351.

p. 100, *Machine Design*, 60 (1988) Oct. 13, No. 24, Cleveland, Ohio, US.

"Goodheart–Wilcox Automotive Encyclopedia", William K. Toboldt, Larry Johnson, Steven W. Olive, 1989, pp. 723–727.

"Automotive Handbook", Bosch 3rd Edition, 1993, pp. 694–697, month unknown.

"Kinematic Analysis of Mechanisms", 1959, J.E. Shigley, pp. 228–231 (month unknown).

"Genevamation Indexing Drives", Jan. 12, 1995 Catalog No. 693, Geneva Mechanisms Corporation.

"Saab 900 Owners Workshop Manual", Haynes Publishing Group, 1979 through 1985, pp. 172–174, 237 (date unknown).

Machine Design, "Basics of Design Engineering", Jun. 1992, Article Mechanical Systems.

A Paper from the Third Conference on Mechanisms, "A Survey of Intermittent–Motion", F.J.Bogardus, 1956, pp. 8–15 (month unknown).

Machine Design, Mechanisms for Intermittent Motion, Dec. 1951, Otto Lichtwitz, pp. 134–148.

"Mechanisms for Providing Intermittent Rotatary Motion", Product Engineering, Aug. 1949, pp. 116–117.

Machine Design, "Mechanisms for Intermittent Motion, Part 2", Jan. 1952, Otto Lichtwitz, pp. 127–141.

(List continued on next page.)

*Primary Examiner*—Nestor Ramirez
*Assistant Examiner*—Judson H. Jones
*Attorney, Agent, or Firm*—Harness, Dickey & Pierce, P.L.C.

[57] ABSTRACT

A multi-functional automotive vehicle apparatus is described which employs a linear motor to wipe a window in a linear reciprocating manner. The linear motor is capable of selectively actuating three intermittent motion mechanisms, such as a window wiper assembly, a window release latch mechanism, and a liftgate unlock/lock mechanism.

20 Claims, 7 Drawing Sheets

U.S. PATENT DOCUMENTS

| | | | |
|---|---|---|---|
| 3,443,455 | 5/1969 | Zugel | 74/820 |
| 3,523,204 | 8/1970 | Rand | 310/94 |
| 3,574,882 | 4/1971 | Petry | 15/250.02 |
| 3,619,676 | 11/1971 | Kawakami | 310/112 |
| 3,659,128 | 4/1972 | Danek | 310/99 |
| 3,665,772 | 5/1972 | Beard et al. | 74/75 |
| 3,688,332 | 9/1972 | Bellware | 15/205.16 |
| 3,689,817 | 9/1972 | Elliott | 318/443 |
| 3,694,723 | 9/1972 | Schneider et al. | 318/443 |
| 3,803,627 | 4/1974 | Schuscheng | 3443/903 |
| 3,837,032 | 9/1974 | Ulbrich | 310/13 X |
| 3,858,922 | 1/1975 | Yamanaka | 292/336.3 |
| 3,917,330 | 11/1975 | Quantz | 292/216 |
| 3,927,436 | 12/1975 | Inoue et al. | 15/250.17 |
| 4,009,952 | 3/1977 | Badalich et al. | 353/109 |
| 4,065,234 | 12/1977 | Yoshiyuki et al. | 417/420 |
| 4,158,159 | 6/1979 | Orris et al. | 318/443 |
| 4,173,055 | 11/1979 | Izumi et al. | 15/250.02 |
| 4,183,114 | 1/1980 | Eden | 15/250.25 |
| 4,259,624 | 3/1981 | Seibicke | 318/282 |
| 4,271,381 | 6/1981 | Munz et al. | 318/282 |
| 4,309,646 | 1/1982 | Liedtke et al. | 318/443 |
| 4,336,482 | 6/1982 | Goertler et al. | 318/443 |
| 4,352,299 | 10/1982 | Riggs et al. | 74/84 R |
| 4,422,522 | 12/1983 | Slavin et al. | 180/281 |
| 4,434,678 | 3/1984 | Maus | 74/471 R |
| 4,450,390 | 5/1984 | Andrei-Alexandru et al. | 318/282 |
| 4,455,520 | 6/1984 | Ward et al. | 318/696 |
| 4,478,004 | 10/1984 | Andrei-Alexandru et al. | 49/72 |
| 4,492,904 | 1/1985 | Graham | 318/444 |
| 4,507,711 | 3/1985 | Ono et al. | 362/61 |
| 4,553,656 | 11/1985 | Lense | 192/142 R |
| 4,573,723 | 3/1986 | Morita et al. | 292/336.3 |
| 4,581,553 | 4/1986 | Moczala | 310/12 |
| 4,630,178 | 12/1986 | Mugford et al. | 362/64 |
| 4,639,065 | 1/1987 | Kohler et al. | 439/540.1 |
| 4,660,698 | 4/1987 | Miura | 192/45 |
| 4,674,781 | 6/1987 | Reece et al. | 292/336.3 |
| 4,702,117 | 10/1987 | Tsutsumi et al. | 251/315.05 |
| 4,733,147 | 3/1988 | Muller et al. | 318/443 |
| 4,782,548 | 11/1988 | Wong | 15/250.21 |
| 4,875,053 | 10/1989 | Harada | 343/903 |
| 4,878,398 | 11/1989 | Heinrich | 74/959 |
| 4,885,512 | 12/1989 | Gille et al. | 318/444 |
| 4,893,039 | 1/1990 | Isii | 310/89 |
| 4,918,272 | 4/1990 | Nishikawa | 200/501 |
| 5,007,131 | 4/1991 | Chevalier et al. | 15/250.19 |
| 5,023,530 | 6/1991 | Ohashi et al. | 318/446 |
| 5,045,741 | 9/1991 | Dvorsky | 310/209 |
| 5,063,317 | 11/1991 | Bruhn | 310/91 |
| 5,182,957 | 2/1993 | Bohmer et al. | 74/42 |
| 5,214,440 | 5/1993 | Takahashi et al. | 343/903 |
| 5,218,255 | 6/1993 | Horiguchi | 310/71 |
| 5,222,775 | 6/1993 | Kato | 292/201 |
| 5,228,239 | 7/1993 | Heo | 49/280 |
| 5,251,114 | 10/1993 | Cantin et al. | 362/286 |
| 5,274,875 | 1/1994 | Chou | 15/250.19 |
| 5,291,109 | 3/1994 | Peter | 318/443 |
| 5,315,735 | 5/1994 | I-Shin | 15/250.22 |
| 5,333,351 | 8/1994 | Sato | 15/250.13 |
| 5,355,061 | 10/1994 | Forhan | 318/443 |
| 5,355,286 | 10/1994 | Flint | 362/65 |
| 5,373,605 | 12/1994 | Austin | 15/250.24 |
| 5,427,345 | 6/1995 | Yamakami et al. | 248/394 |
| 5,462,337 | 10/1995 | Yamakami | 397/344.13 |
| 5,519,258 | 5/1996 | Stroven et al. | 307/10.1 |
| 5,528,959 | 6/1996 | Yamakami | 74/665 GD |
| 5,536,983 | 7/1996 | Araki et al. | 310/12 |
| 5,564,156 | 10/1996 | Habba | 15/250.24 |
| 5,691,586 | 11/1997 | Yonnet et al. | 310/75 D |
| 5,694,812 | 12/1997 | Maue et al. | 74/471 R |
| 5,730,028 | 3/1998 | Maue et al. | 74/480 |

OTHER PUBLICATIONS

Machine Design, "Mechanisms for Intermittent Motion, Part 3", Feb. 1952, Otto Lichtwitz, pp. 146–155.

Machine Design, "Mechanisms for Intermittent Motion, Part 4", Mar. 1952, Otto Lichtwitz, pp. 147–155.

A paper from the Third Conference on Mechanisms, "Designing for Intermittent Motion with Modified Starwheels", Karl E. Kist, pp. 16–20 (date unknown).

"Mechanisms for Engineering Design" Motion, Circular, Intermittent, Chapter 3, S.B. Tuttle, John Wiley Co., pp. 33–51 (date unknown).

Machine Design, "Modifying Starwheel Mechanisms", Vandeman and Wood, Apr. 1953, pp. 255–261.

"Kinematics of Intermitent Mechanism III—The Spherical Geneva Wheel", Product Engineering, Oct. 1949, S. Rappaport, pp. 137–139.

Machine Design, "Mechanical Systems", Jun. 1992, pp. 130, 132, 168.

"Mechanisms and Dynamics of Machinery", Hamilton H. Mabie and Fred W. Ocvirk, John Wiley & Sons, 1957 (month unknown).

A paper from the International Congress & Exposition, SAE Technical Paper Series 960390, "Liftgate Multiplexed Node", Feb., 1996, H. Winston Maue, pp. 73–76. R

MULTI-FUNCTIONAL APPARATUS EMPLOYING A LINEAR WIPER

BACKGROUND OF THE INVENTION

This invention relates generally to multi-functional apparatuses and specifically to a multi-functional apparatus employing a linear motor for use in an automotive vehicle.

Almost all automotive vehicles have a single or a pair of windshield wiper assemblies. These assemblies traditionally include rubber wiper blades mounted upon claw brackets. These claw brackets are attached to wiper arms mounted upon rotating shafts. These shafts are either directly driven by electric motors or driven by a single electric motor which actuates series or parallel-coupled four-bar linkage mechanisms. It is further known to provide a wiper system in combination with a wash device, to clean headlamps for automotive vehicles.

It is also common to employ a window wiper assembly for cleaning rear windows of automotive vehicles. Typically, these types of rear window wiper assemblies include a wiper blade mounted upon a bracket which is coupled to a wiper arm. The wiper arm is attached to a wiper shaft rotatably driven in a cyclical oscillating manner by a helical gear. A reversible, fractional horsepower, dc electric motor serves to actuate the helical gear through an armature shaft-mounted worm gear enmeshed therewith. This type of rear window wiper arrangement is usually mounted upon a pivoting liftgate of a minivan, station wagon, sport-utility vehicle or the like. Examples of conventional window wiper assemblies and motor mechanisms are disclosed within the following U.S. Patents: U.S. Pat. No. 4,893,039 entitled "Windshield Wiper Motor" which issued to Isii on Jan. 9, 1990; U.S. Pat. No. 4,878,398 entitled "Driving Device for Window Wiper of Motor Vehicles" which issued to Heinrich on Nov. 7, 1989; U.S. Pat. No. 4,336,482 entitled "Rear Window Wiper Motor Control" which issued to Goertler et al. on Jun. 22, 1982; U.S. Pat. No. 4,259,624 entitled "Arrangement for Wiping a Vehicle Window" which issued to Seibicke on Mar. 31, 1981; U.S. Pat. No. 3,694,723 entitled "Motor Vehicle Windshield Wiper Having a Parking Position Outside the Wiper Area" which issued to Schneider et al. on Sep. 26, 1972; and, U.S. Pat. No. 3,665,772 entitled "Windshield Wiper Motor Link Depressed Park Mechanism" which issued to Beard et al. on May 30, 1972. All of these patents are incorporated by reference herewithin.

Recently, linear-motion wiper structures have been proposed as an alternative to conventional arcuate-motion wiper structures. One such structure comprises a multi-stage hydraulic cylinder arm which can be driven by a transmission mechanism having both vertical and horizontal displacement functionality whereby a blade, which is driven by the arm, can wipe on the windshield in a linear reciprocating motion so as to completely clear the drops of rain on the windshield, and this may provide a clear vision for users who drive in the rain. An example of this structure is disclosed in U.S. Pat. No. 4,782,548 which issued to Wong on Nov. 8, 1988, the entire disclosure of which is hereby incorporated by reference.

Additionally, an alternative linear-motion wiper structure has been proposed. This apparatus for wiping a window has a wiper, a first track substantially parallel to at least a portion of the window and a second track substantially parallel to and displaced from the first track. A first motorized drive wheel is provided for driving the wiper along the first track in a first direction and a second motorized drive wheel for driving the wiper along the second track in a second direction, opposite to the first direction, so as to wipe the window. The wiper is preferably designed to reduce dragback of water across the window. In a preferred embodiment, curved connecting tracks connect between the ends of the first track and the second track so as to form a closed loop track. A single motorized drive wheel is used. The single motorized drive wheel may be driven by a motor rotatably associated with the wiper, or through a flexible drive cable by a remotely mounted motor. Other embodiments use a single substantially linear track in combination with a motor running unidirectionally. An example of this structure is disclosed in U.S. Pat. No. 5,564,156 which issued to Habba on Oct. 15, 1996, the entire disclosure of which is hereby incorporated by reference.

Some conventional vehicles also provide a rear window release lock or latch, actuated by a solenoid, which can be unlocked to allow for upward pivotal movement of the rear window in relation to the otherwise stationary liftgate. In combination therewith, a separate liftgate lock is often mounted upon the liftgate door for fastening the liftgate to the body to prevent inadvertent pivotal opening.
This liftgate lock is traditionally operated by manual key or handle rotation, or through a separate electric motor or solenoid.

Additionally, separate motors and solenoids are required to actuate passenger door locks, an antenna retraction mechanism, headlamp cover retraction mechanisms, a fuel filler door lock and other similar functions. The traditional need for such a multiplicity of electromagnetic devices has increased the automotive vehicle weight and cost while further proving difficult to package within the often small spaces provided. This added weight is especially detrimental when the window wiper mechanism, rear window lock and liftgate lock, as well as their distinct respective electromagnetic devices, are all incorporated within the pivoting liftgate. Not only is the piece cost increased due to this multiplicity of electromagnetic devices, but the assembly cost, part number proliferation and handling costs, electrical wiring costs, objectional motor noise, and failure modes are increased.

Recently, a multi-functional apparatus employing an intermittent motion mechanism has been proposed. A single electromagnetic device selectively causes movement of the intermittent motion mechanisms thereby moving mechanical devices coupled thereto. In a specific embodiment, the armature shaft of an electric motor rotates a worm gear segment which then drives a helical gear mounted in a gear housing. Via a series of pins, cams and gears, also mounted in the housing, this input can be made to drive selectively two or three intermittent rotary motion mechanisms according to the rotary position of the helical gear. Mechanical devices which are coupled to the intermittent rotary motion mechanisms, e.g., a rear window wiper, a liftgate lock and a liftgate window release lock, are therefore operated according to the positional range of oscillation or movement of the helical gear. In this way, the number of electromagnetic devices, or motors, required to be fitted to a vehicle liftgate is reduced. An example of this apparatus is disclosed in U.S. patent application Ser. No. 08/430,388 to Zimmer et al. which was filed on Apr. 28, 1995, the entire disclosure of which is hereby incorporated by reference.

Additionally, a multi-functional apparatus employing an electromagnetic device has been proposed. To save weight and space and reduce costs in a vehicle, a multi-functional apparatus is used in place of a plurality of single-function devices. The multi-functional apparatus employs a single electromagnetic device to selectively actuate a plurality of intermittent motion mechanisms, thereby operating mechanical devices attached thereto. In a specific example, a reversible dc electric motor selectively drives a rear window wiper via a transmission, a clutch and a driven shaft. By rotating the transmission member beyond the rotational range for operating the wiper, drive to the wiper is disengaged and a locking mechanism for the rear window or liftgate can also be actuated by the rotating transmission member. In another aspect, a single electric motor selectively actuates three intermittent motion mechanisms thereby causing three mechanical devices coupled thereto to operate (e.g., rear window and liftgate locking mechanisms and a window wiper). An example of this apparatus is disclosed in U.S. patent application Ser. No. 08/431,148 to Maue et al. which was filed on Apr. 28, 1995, the entire disclosure of which is hereby incorporated by reference.

Finally, a control system for an automotive vehicle multi-functional apparatus has been proposed. A control system for an automotive vehicle multi-functional apparatus employs an electronic control unit operably controlling a rear window wiper assembly. In another aspect, an electronic control unit is operable as a multiplexed rear node for controlling a variety of liftgate devices and functions. In a further aspect, an electronic control unit controls a single multi-functional electromagnetic device. The multi-functional electromagnetic device uses intermittent motion mechanisms to selectively operate differing devices driven therefrom. A method of operating the electronic control unit is also provided. An example of this system is disclosed in U.S. patent application Ser. No. 08/431,149 which was filed on Apr. 28, 1995, the entire disclosure of which is hereby incorporated by reference.

SUMMARY OF THE INVENTION

In accordance with the present invention, the preferred embodiment of a multi-functional apparatus employs an intermittent motion mechanism. An electromagnetic device selectively causes movement of the intermittent motion mechanism thereby moving a mechanical device coupled thereto. In another aspect of the present invention, a pair of intermittent motion mechanisms are selectively actuated by a single reversible electric motor. In a further aspect of the present invention, a single electric motor selectively actuates three intermittent motion mechanisms thereby causing three mechanical devices to operate. In a still further aspect of the present invention, a linear wiper is mechanically coupled to a linear electric motor.

The multi-functional apparatus of the present invention is advantageous over conventional systems since the present invention combines many different functions into a single apparatus. For example, the multi-functional apparatus of the present invention replaces the traditional separate rear wiper motor, liftgate lock motor and rear window lock solenoid. Accordingly, the multi-functional apparatus of the present invention significantly reduces the piece cost, assembly cost, part proliferation and handling costs, wiring costs, and battery current consumption as compared to conventional constructions. Furthermore, the multi-functional apparatus of the present invention significantly reduces weight and packaging space requirements while increasing the electrical and mechanical reliability of the affected systems. Objectional motor and solenoid noises are also reduced. Furthermore, the present invention provides a linear-motion wiper structure which can provide a clear vision for the users when driving in the rain so as to increase the driving security. Additionally, the present invention provides a linear-motion wiper structure which adapts to different windshields, and the blade of the wiper structure can wipe in a horizontal reciprocating motion on the windshield so as to provide an excellent vision for users. Furthermore, the linear-motion wiper of the present invention wipes a greater surface area of a window than an arcuate-motion wiper. Additionally, the linear-motion wiper of the present invention will wipe the entire surface of the window, as opposed to the 140 degree sweep of conventional arcuate-motion wipers. Moreover, the present invention provides a linear-motion wiper structure which can cooperate with a power supply to drive the blade of the wiper structure so as to provide a more practical application. Furthermore, the present invention provides a linear-motion wiper structure which can cooperate with the pair of intermittent motion mechanisms and devices associated therewith. Additional advantages and features of the present invention will become apparent from the following description and appended claims, taken in conjunction with the accompanying drawings.

DETAILED DESCRIPTION OF THE PREFERRED EMBODIMENT

It should be understood that, while the invention will herein be described in connection with a window, it can be equally applied to any surface for which an automated wiping apparatus is desirable. Furthermore, it is not limited to rectangular surfaces or planar surfaces. The wiping motion can be horizontal, vertical or along any other preferred wiping path. It should further be appreciated that features of the present invention described in the context of one embodiment are equally applicable to other embodiments hereinbelow described.

Figure 1:
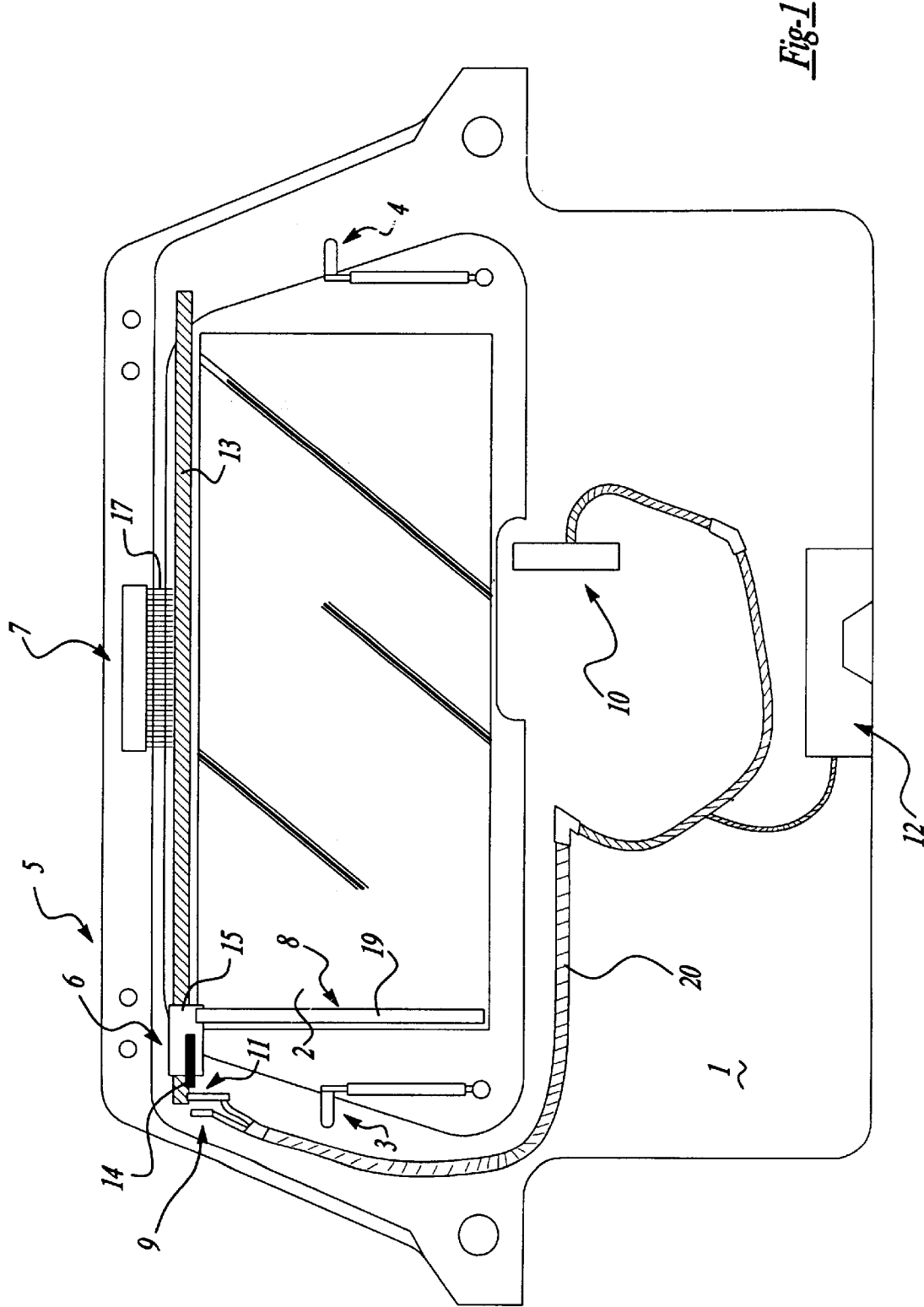
FIG. 1 is a front elevational view showing the preferred embodiment of a multi-functional apparatus of the present invention.

An automobile vehicle, such as a minivan, station wagon, or sport utility vehicle or the like, has a rear liftgate door which can pivot about an upper pair of hinges coupled to the vehicle body structure. When the liftgate is pivoted to an open position, a cargo space is accessible from behind the vehicle. Such a liftgate is shown in FIG. 1. Liftgate 1 has a rear window or backlite 2 pivotable between a closed position, substantially flush with the outer surface of liftgate 1, to an open position about upper hinges. A pair of pneumatic cylinders 3 and 4 act to push window 2 toward the open position when a lower portion of window 2 is released. The preferred embodiment of a multi-functional apparatus 5 of the present invention is mounted upon an outer surface of liftgate 1. A portion of apparatus 5 may be hidden by an exterior trim panel (not shown). Apparatus 5 primarily includes a linear motor 6, a controller 7, a window wiper assembly 8, a window release latch or lock actuator 9, window release latch or lock 10 mechanism, liftgate unlock/lock actuator 11, and liftgate unlock/lock mechanism 12, all of which are mounted upon liftgate 1. Examples of such locks (employing separate solenoids or motors, which would be removed in order to couple the lock mechanism for use with the present invention) are disclosed within the following U.S. patents: U.S. Pat. No. 5,222,775 entitled "Power Operated Latch Device for Automotive Back Door" which issued to Kato on Jun. 29, 1993; U.S. Pat. No. 4,422,522 entitled "Inertial Lock for Vehicle Door Latch" which issued to Slavin et al. on Dec. 27, 1983; and, U.S. Pat. No. 3,917,330 entitled "Electric Lock Release" which issued to Quantz on Nov. 4, 1975, the entire specifications of which are incorporated herein by reference.

Figure 2:
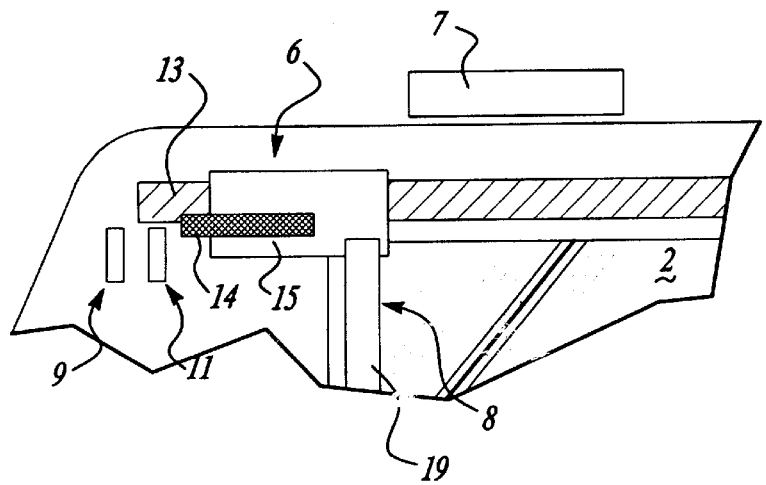
FIG. 2 is a partial fragmentary view of a portion of a multi-functional apparatus of the present invention.
Figure 3:
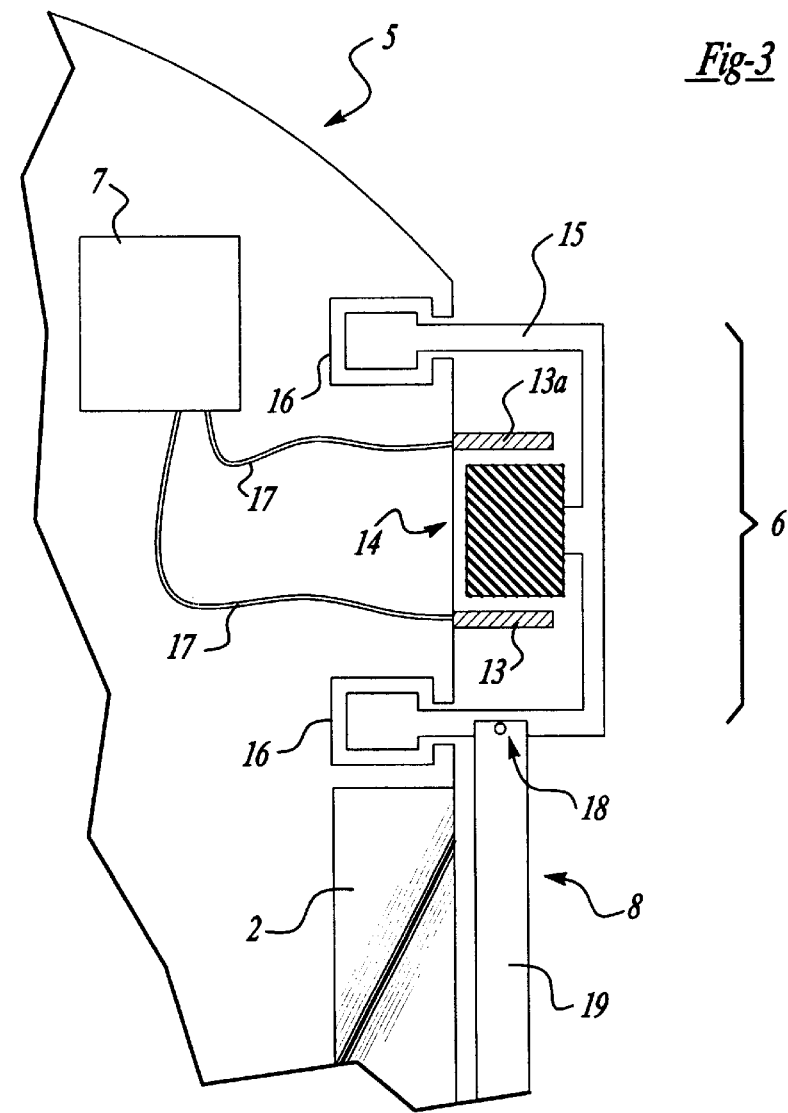
FIG. 3 is a partial sectional view of a portion of a multi-functional apparatus of the present invention.

The construction of linear motor 6 is best illustrated in FIGS. 2–3. Linear motor 6 may be comprised of any number of readily commercially available linear motors, such as those available from Compumotor Corporation (Petaluma, Calif.). Although linear motor 6 is shown mounted to the upper position of tailgate 1, it could also be mounted to the lower portion of tailgate 1, or any other suitable portion of an automobile.

In accordance with one embodiment of the present invention, linear motor 6 includes at least one stator 13 and/or 13a and an armature 14 which is disposed in housing 15. Armature 14 generally is oriented above stator 13, if one stator is employed. If two stators are employed, one is positioned above armature 14 and one is positioned below armature 14 so as to preferably align vertically. Housing 15 may ride in a groove or series of grooves 16, and thus is slidably mounted onto tailgate 1. Since armature 14 is attached to housing 15, it is important for housing 15 to be able to move freely in conjunction with the relative movements of armature 14.

Stator 13 comprises at least one elongated structural unit of magnetically conductive material. Generally, this magnetically conductive material is a series of tightly wound metallic coils. When stator 13 is subjected to a flow of current, an electromagnetic field is induced in stator 13.

Preferably, a controller 7 is used to control the amount and duration of current flowing to each individual coil of stator 13. Controller 7 is electrically connected to stator 13 by a plurality of wires 17. Alternatively, if a second stator is employed (i.e., stator 13a), it too would be electrically connected to controller 7 in the same manner. Although only a limited number of wires 17 are shown, it should be appreciated that each individual coil has its own individual wire 17 connecting that individual coil to controller 7. Armature 14, which is generally a tightly wound series of metallic coils, and is preferably a permanent magnet, is affected by the electromagnetic field induced in stator 13. As a result, armature 14 generally moves in a direction along stator 13 in response to the current being applied by controller 7. Controller 7 can move armature 14 both left and right with respect to stator 13. Controller 7 can also cause armature 14 to stop moving at any point along stator 13. Controller 7 preferably uses pulse width modulation (PWM) to control the relative movements of armature 14. PWM is generally defined as using a control circuit to pulse current into coils, thereby inducing an electromagnetic field. This electromagnetic field will attract the armature. By controlling the amount of time this electromagnetic field is active and the time (width) as to when the following or adjacent coil is energized, speed and torque of a moving armature can be governed.

Linear motor 6 is referred to as an intermittent motion mechanism due to the fact that it does not always need to be in motion, as will become apparent from the following description.

Linear motor 6 is used, among other things, for providing locomotion for wiper assembly 8 in order to wipe window 2. Wiper assembly 8 is preferably mounted to housing 15 by a spring biased pivot pin 18. This allows wiper assembly 8 to pivot upwardly and outwardly when liftgate 1 is opened. Conventionally, a typical wiper assembly generally includes a wiper arm and a wiper blade, which is typically slidably mounted or received on the wiper arm. However, in accordance with one embodiment of the present invention, the wiper blade superstructure 19 is directly mounted to housing 15, thus eliminating the need for a wiper arm.

Figure 4:
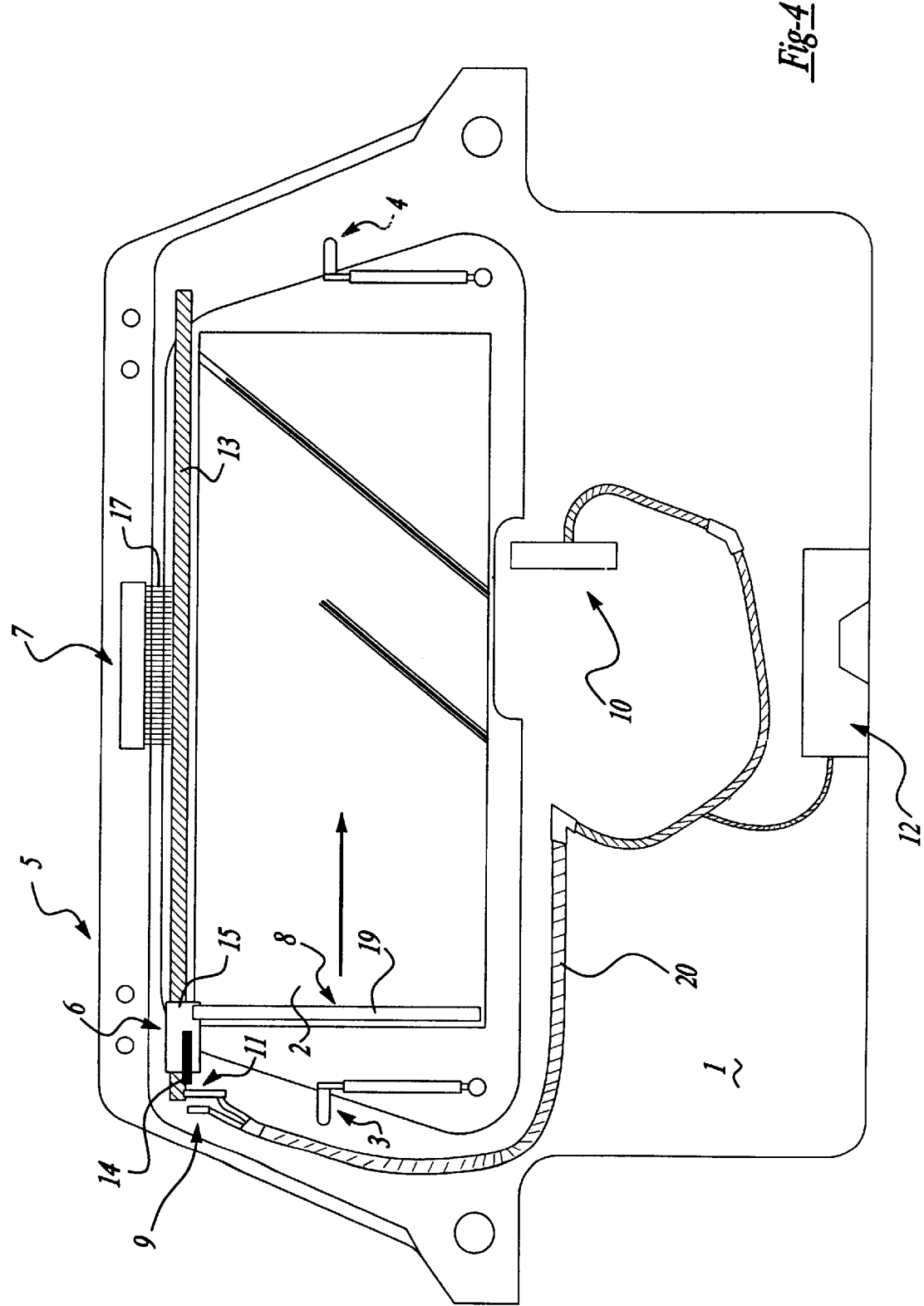
FIG. 4 is a front elevational view illustrating a window wiper assembly of a multi-functional apparatus of the present invention in a parked position.

Referring specifically to FIG. 4, wiper assembly 8 is shown near the left periphery of window 2. This position is designated as the parked position for reference purposes. If a person wishes to initiate a wiping operation upon window 2, an actuator (typically located on an instrument panel or other control panel) sends an electrical signal to controller 7 to apply a current to stator 13. The current applied by controller 7 may come from the automobile's main power supply or controller 7 may have its own dedicated power supply (either ac or dc current). Controller 7 then sends a current through the plurality of wires 17 to the individual coils of stator 13 which are immediately adjacent to the right side of armature 14. At that point, an electromagnetic field is induced in that particular portion of stator 13. In response to this electromagnetic field, armature 14 is attracted toward those coils in the direction of the arrow. As armature 14 moves, wiper assembly 8 moves a like distance. As wiper assembly 8 moves, wiper blade 19 moves a like distance. In this manner window 2 is wiped.

Figure 5:
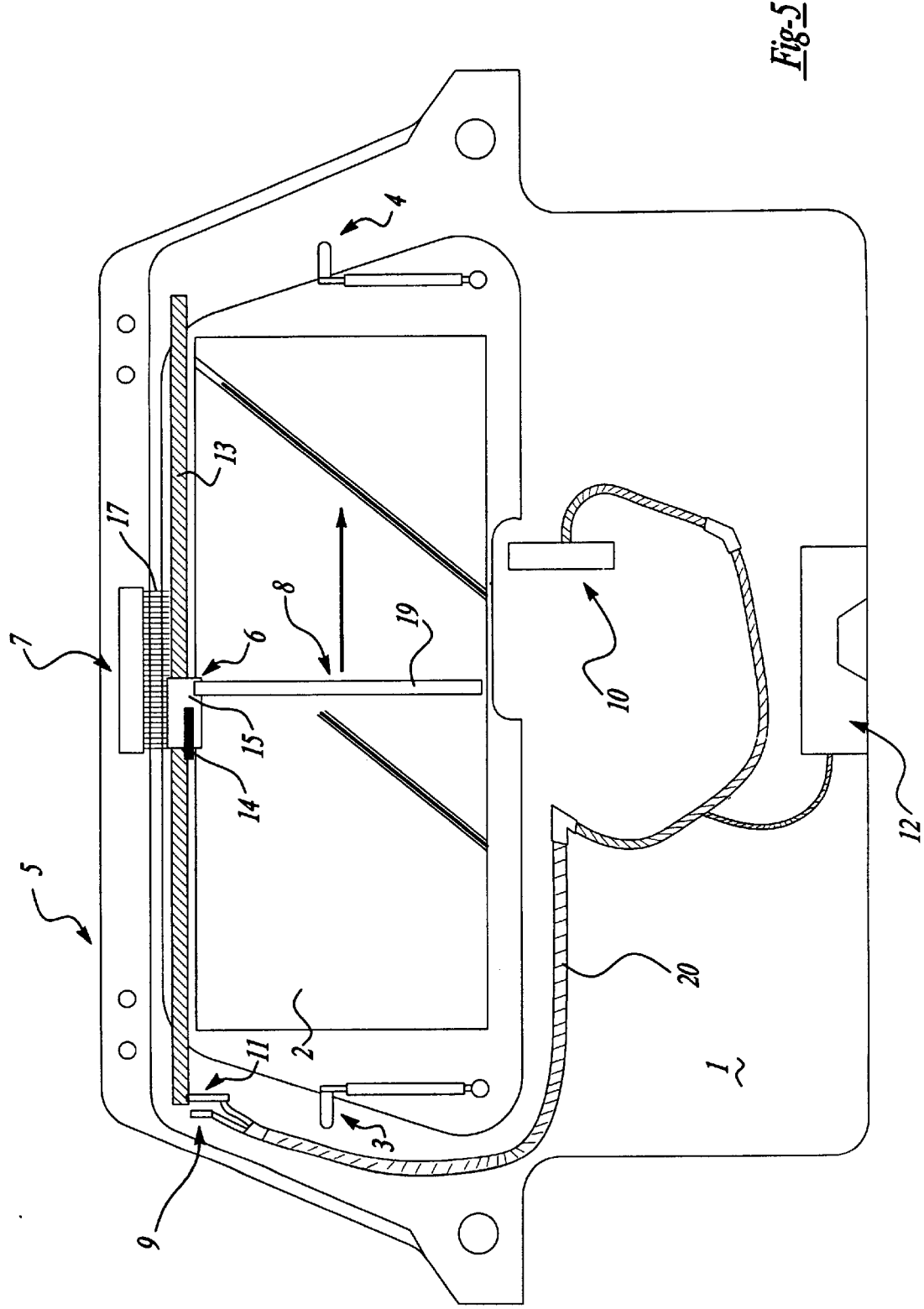
FIG. 5 is a front elevational view illustrating the window wiper assembly of a multi-functional apparatus of the present invention in a midway position on the window.

Referring specifically to FIG. 5, wiper assembly 8 is shown at a midway point on window 2. This was accomplished by selectively and sequentially energizing the coils of stator 13 which lie to the right of armature 14, and selectively and sequentially deenergizing the coils of stator 13 which lie to the left of armature 14. This function is accomplished by controller 7.

Figure 6:
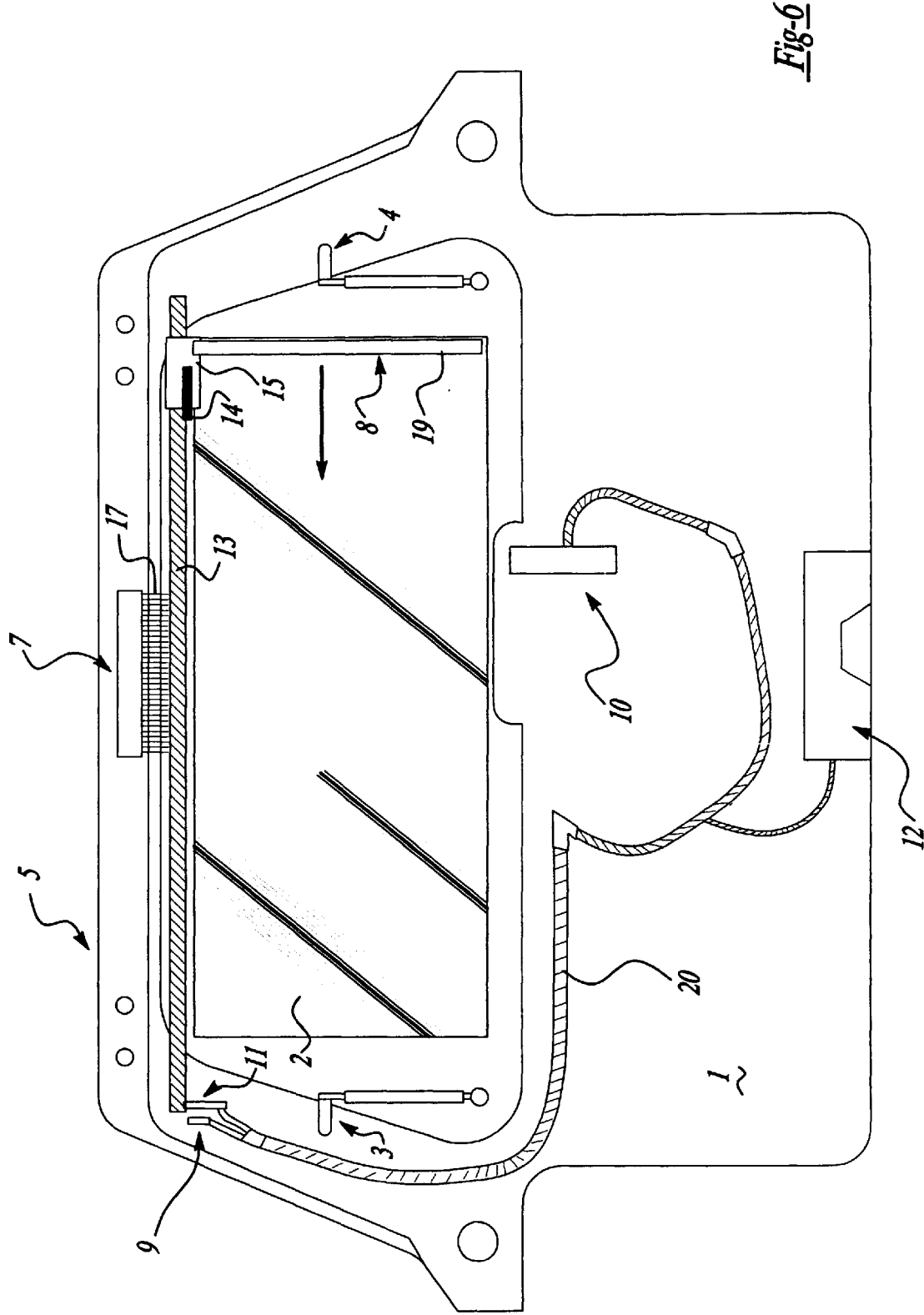
FIG. 6 is a front elevational view illustrating the window wiper assembly of a multi-functional apparatus of the present invention in a terminal position on the window.

Referring specifically to FIG. 6, wiper assembly 8 is shown at a terminal position on window 2. It is referred to as a terminal position because it marks the end of the initial wipe cycle. Additionally, it is the furthest position that wiper assembly 8 can assume adjacent to the right periphery of window 2. At this point, wiper assembly 8 is ready to make the return wipe stroke back to the parked position shown in FIG. 4. In order to accomplish this, controller 7 must selectively and sequentially energize the individual coils of stator 13 so as to cause armature 14 to move in a direction that is opposite that of the initial wipe cycle. This is accomplished by selectively reversing the polarity of the individual coils of stator 13. Therefore, the coils immediately adjacent to the left side of armature 14 are energized so as to attract armature 14 in the direction of the arrow. The coils immediately adjacent to the right side of armature 14 are deenergized so as to repel armature 14 in the direction of the arrow. The coils are selectively and sequentially energized and deenergized until wiper assembly 8 returns to the parked position as shown in FIG. 4. At that point another wipe cycle can take place (e.g. in rainy conditions) or stator 13 can be completely deenergized (e.g. shutting the window wiper function off once the rainy conditions have subsided).

As can be seen in FIGS. 4–6, wiper assembly 8 moves in a linearly reciprocating manner. That is, wiper assembly 8 moves back and forth in a straight line across window 2, as opposed to a conventional arcuate manner. The speed at which wiper assembly 8 moves across the window 2 can be controlled by controller 7. For example, a rotary dial on the instrument panel or control panel would allow a person to select an infinite number of speeds at which wiper assembly 8 would function by increasing/decreasing the energization/deenergization time intervals of the individual coils of stator 13.

Apparatus 5 is also useful for actuating several other intermittent motion mechanisms, such as liftgate unlock/lock mechanisms and window release lock or latch mechanisms.

In accordance with one aspect of the present invention, linear motor 6 actuates liftgate unlock/lock actuator 11 and window release latch actuator 9. Lifegate unlock/lock actuator 11 and window release latch actuator 9 are located in close proximity to the left periphery of stator 13. Liftgate unlock/lock actuator 11 and window release latch actuator 9 can be comprised of toggle switches or other suitable means for actuating such as first class levers, second class levers, or linkages. Although it is generally envisioned that armature 14 of linear motor 6 will actuate liftgate unlock/lock actuator 11 and window release latch actuator 9, this can equally be accomplished by housing 15 or some other projection mounted on linear motor 6. Basically, liftgate unlock/lock actuator 11 and window release latch actuator 9 are actuated by having one of their respective surfaces physically urged or abutted by a surface portion of linear motor 6, preferably armature 14. In accordance with a preferred embodiment of the present invention, armature 14 is removably fastened to housing 15 by means of a clip or like device. Thus, wiper assembly 8 and housing 15 remain in the park position, while armature 14 disengages from housing 15 and moves to the left of the left periphery of window 2 so as to be able to actuate liftgate unlock/lock actuator 11 and window release latch actuator 9. Of course, in this particular embodiment, armature 14 would preferably need an additional support means, other than housing 15, in order to allow armature 14 to travel to the left of the left periphery of window 2.

Liftgate unlock/lock actuator 11 and window release latch actuator 9 are either mechanically or electrically connected to liftgate unlock/lock mechanism 12 and window release latch mechanism 10, respectively. If they are electrically connected, a wire harness 20 is preferably used. If they are mechanically connected, a pulley system, a lever system, a tension wire system, a cable system, or other suitable system can be employed to effect actuation of liftgate unlock/lock mechanism 12 and window release latch mechanism 10, respectively.

In order to actuate liftgate unlock/lock actuator 11 and window release latch actuator 9, it is necessary to move linear motor 6 to the left of its park position as illustrated in FIG. 4. In order to accomplish this, controller 7 must selectively and sequentially apply a current to the coils of stator 13 which lie to the left of armature 14.

Figure 7:
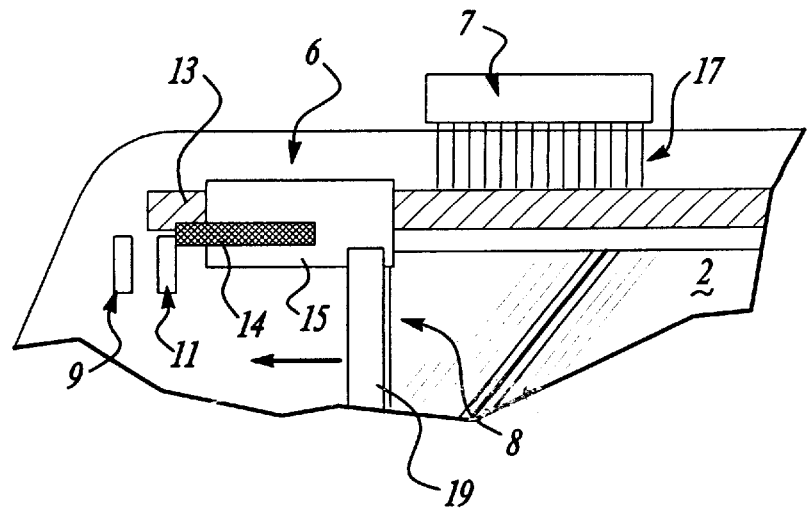
FIG. 7 is a partial fragmentary view of the linear motor of a multi-functional apparatus of the present invention as the linear motor is about to actuate the liftgate unlock function of the liftgate unlock/lock actuator.

Referring specifically to FIG. 7, a current has been selectively and sequentially applied to the coils immediately adjacent to the left side of armature 14. This current has induced an electromagnetic field in that portion of stator 13, thus attracting armature 14 in the direction of the arrow. FIG. 7 clearly illustrates that armature 14 has moved slightly to the left toward liftgate unlock/lock actuator 11 and window release latch actuator 9, and away from window 2. Although FIG. 7 shows housing 15 and the associated wiper assembly 8 also moving to the left, it should be appreciated that it is envisioned that armature 14 may disengage from housing 15. Thus, only armature 14 would move to the left.

Figure 8:
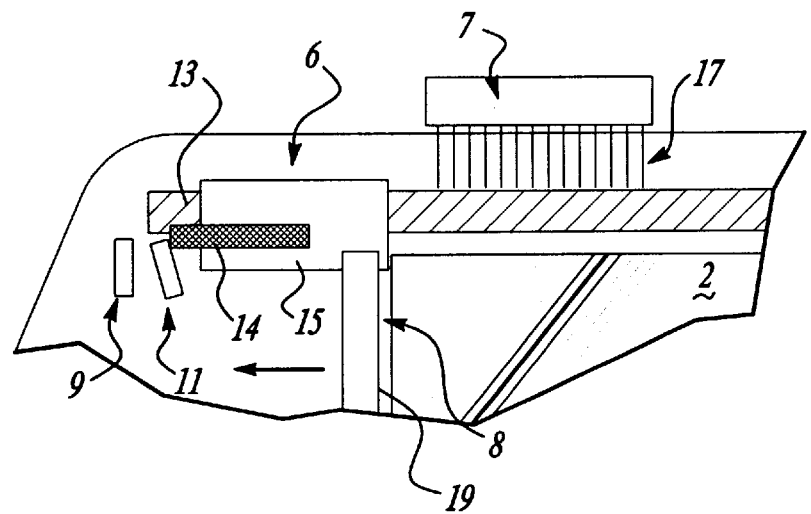
FIG. 8 is a partial fragmentary view of the linear motor of a multi-functional apparatus of the present invention as the linear motor actuates the liftgate unlock function of the liftgate unlock/lock actuator.

Referring specifically to FIG. 8, the current from controller 7 is still being applied selectively and sequentially so as to allow armature 14 to move even further to the left in the direction at the arrow. At this point, a surface of armature 14 is urging up against, or abutting a surface of liftgate unlock/lock actuator 11, thus actuating the unlock function of liftgate unlock/lock mechanism 12. Although FIG. 8 shows housing 15 and the associated wiper assembly 8 also moving to the left, it should be appreciated that it is envisioned that armature 14 may disengage from housing 15. Thus, only armature 14 would move to the left.

Figure 9:
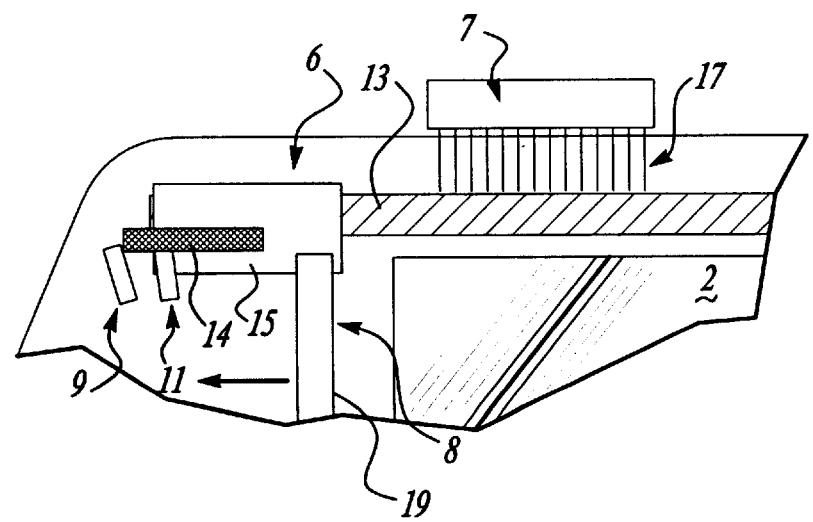
FIG. 9 is a partial fragmentary view of the linear motor of a multi-functional apparatus of the present invention as the linear motor actuates the window release latch actuator.

Referring specifically to FIG. 9, the current from controller 7 is still further being applied selectively and sequentially so as to allow armature 14 to move even still further to the left in the direction of the arrow. At this point, a surface of armature 14 is urging up against, or abutting a surface of window release latch actuator 9, thus actuating window release latch mechanism 10. Although FIG. 9 shows housing 15 and the associated wiper assembly 8 also moving to the left, it should be appreciated that it is envisioned that armature 14 may disengage from housing 15. Thus, only armature 14 would move to the left.

Figure 10:
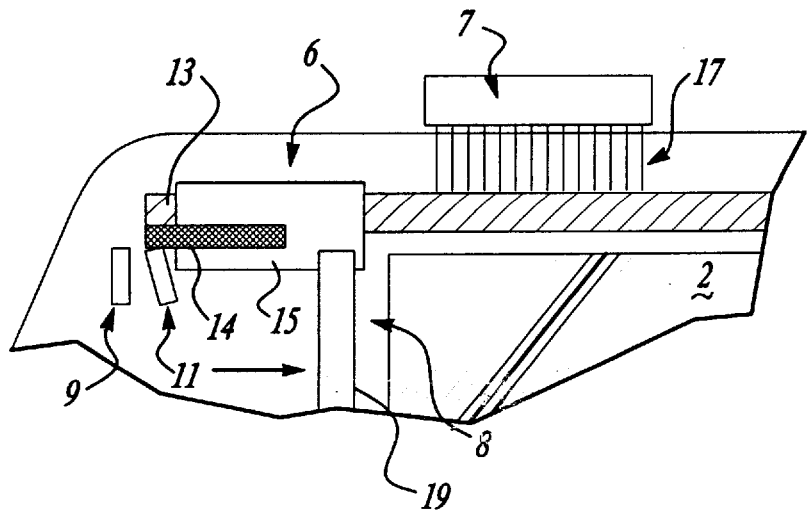
FIG. 10 is a partial fragmentary view of the linear motor of a multi-functional apparatus of the present invention as the linear motor actuates the liftgate lock function of the liftgate unlock/lock actuator.

Referring specifically to FIG. 10, the polarity of the coils of stator 13 is reversed by controller 7 so as to be able to move armature 14 back to the right in the direction of the arrow. At this point a surface of armature 14 is urging up against, or abutting a surface of liftgate unlock/lock actuator 11, thus actuating the lock function of liftgate unlock/lock mechanism 12. Although FIG. 10 shows housing 15 and the associated wiper assembly 8 also moving to the right, it should be appreciated that it is envisioned that armature 14 may disengage from housing 15. Thus, only armature 14 would move to the right.

Figure 11:
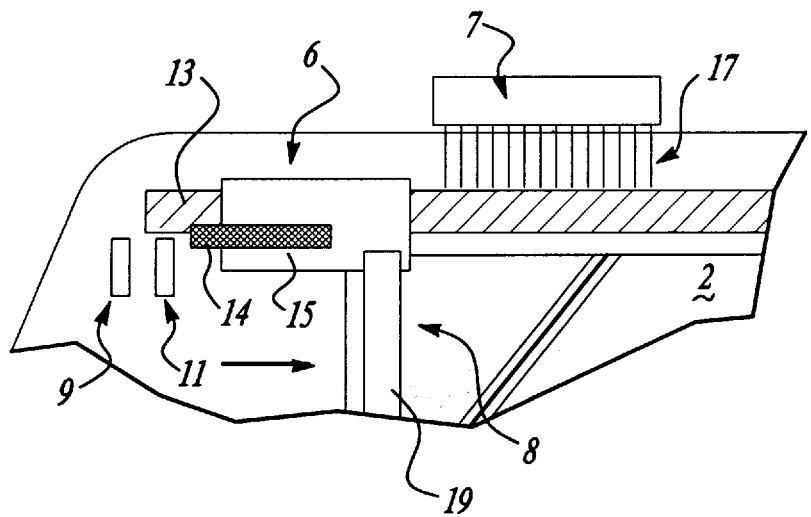
FIG. 11 is a partial fragmentary view of the linear motor of a multi-functional apparatus of the present invention as the linear motor returns to a parked position.

Referring specifically to FIG. 11, linear motor 6 has returned to the parked position, similar to that shown in FIG. 4.

Various materials have been disclosed in an exemplary fashion, however, other materials may of course be employed. It is intended by the following claims to cover these and any other departures from the disclosed embodiments which fall within the true spirit of this invention.

The invention claimed is:

1. A multi-functional automotive vehicle apparatus comprising:
   a linear motor; and
   a first intermittent motion mechanism selectively driven by a portion of said linear motor for changing orientation of said first intermittent motion mechanism, said portion of said linear motor being selectively movable while said first intermittent motion mechanism is substantially stationary.

2. The multi-functional apparatus of claim 1, further comprising a second intermittent motion mechanism having a surface engagable with said portion of said linear motor for changing orientation of said second intermittent motion mechanism.

3. The multi-functional apparatus of claim 1 wherein said linear motor comprises:
   at least one stationary stator device; and
   an armature device operably travelling relative to said stator device in a travel direction;
   said stator device being elongated in said travel direction greater than said armature, at least one of said devices being energizable to create a magnetic field.

4. The multi-functional apparatus of claim 3 wherein said linear motor further comprises a housing, said armature being disposed within said housing, said housing being able to travel relative to said stator in said travel direction, said housing substantially hiding at least a majority of said armature from view.

5. The multi-functional apparatus of claim 1 further comprising a liftgate release lock coupling member wherein said first intermittent motion mechanism operably actuates said liftgate release lock coupling member between a locked orientation and an unlocked orientation, substantially linear movement of said portion of said linear motor causing actuation of said first intermittent motion mechanism.

6. The multi-functional apparatus of claim 1 further comprising a window release lock coupling member wherein said first intermittent motion mechanism operably actuates said window release lock coupling member between a locked orientation and an unlocked orientation, substantially linear movement of said portion of said linear motor causing actuation of said first intermittent motion mechanism.

7. The multi-functional apparatus of claim 4 further comprising:
   a window; and
   a wiper assembly operably wiping said window, said wiper assembly being pivotally attached to said housing of said linear motor.

8. The multi-functional apparatus of claim 1 further comprising a wiper assembly independently movable from said first intermittent motion mechanism, said wiper assembly being selectively coupled to said linear motor.

9. The multi-functional apparatus of claim 3 further comprising an electronic control unit controlling a current applied to said stator, said control unit employing pulse width modulation to control the current applied to said stator, said stator including a wire winding.

10. A multi-functional automotive vehicle apparatus comprising:
    a linear motor;
    a wiper assembly operably driven by said linear motor;
    a first intermittent motion mechanism selectively driven by said linear motor for changing orientation of said first intermittent motion mechanism; and
    a lock assembly selectively driven by said linear motor, one of said assemblies being selectively coupled to said first intermittent motion mechanism.

11. The multi-functional apparatus of claim 10, further comprising a second intermittent motion mechanism having a surface engagable with a surface of said linear motor for changing orientation of said second intermittent motion mechanism.

12. The multi-functional apparatus of claim 10 wherein said linear motor comprises:
    at least one stator having at least one elongated structural unit of magnetically conductive material, said stator being stationarily mounted to said vehicle; and
    an armature able to travel relative to said stator in a travel direction that is the same as an elongated direction of said structural unit.

13. The multi-functional apparatus of claim 10 wherein said lock assembly is a liftgate release lock, said first intermittent motion mechanism includes means for actuating said liftgate release lock between a locked orientation and an unlocked orientation.

14. The multi-functional apparatus of claim 11 wherein said second intermittent motion mechanism includes a rotatable member driving said lock assembly between a locked orientation and an unlocked orientation.

15. The multi-functional apparatus of claim 10 further comprising an electronic control unit controlling a current applied to said stator, said control unit employing pulse width modulation to control the current applied to said stator.

16. An automotive vehicle apparatus comprising:
    (a) a linear motor including:
        at least one stator device stationarily affixed to said vehicle and being elongated in at least a first direction; and
        an armature device operably traveling relative to said stator device in said first direction, said stator device being energizable to create a magnetic field around said armature device, said armature device being substantially centrally located in said magnetic field, said armature device being shorter than said stator device in said first direction;
    (b) a window wiper assembly movable with said armature device in said first direction; and
    (c) an electronic control unit controlling a current operably applied to one of said devices, said electronic control unit being operable to infinitely vary the speed at which said wiper assembly travels.

17. The apparatus of claim 16, wherein said window wiper assembly travels in a linearly reciprocating manner, said electronic control unit employing pulse width modulation to control the current applied to said stator device.

18. The apparatus of claim 16 wherein said armature device is located between two of said stator devices.

19. The apparatus of claim 16 wherein said at least one stator device includes a wire winding, at least a portion of said wire winding is located above said armature device.

20. The apparatus of claim 1 wherein at least a section of said first intermittent motion mechanism is rotated in response to being disengagably abutted by said portion of said linear motor moving in a substantially linear direction.

* * * * *